June 6, 1961
F. U. SULMER
2,986,946
AUTOMATIC ERECTION CONTROL FOR GYROSCOPE
Filed Dec. 29, 1959
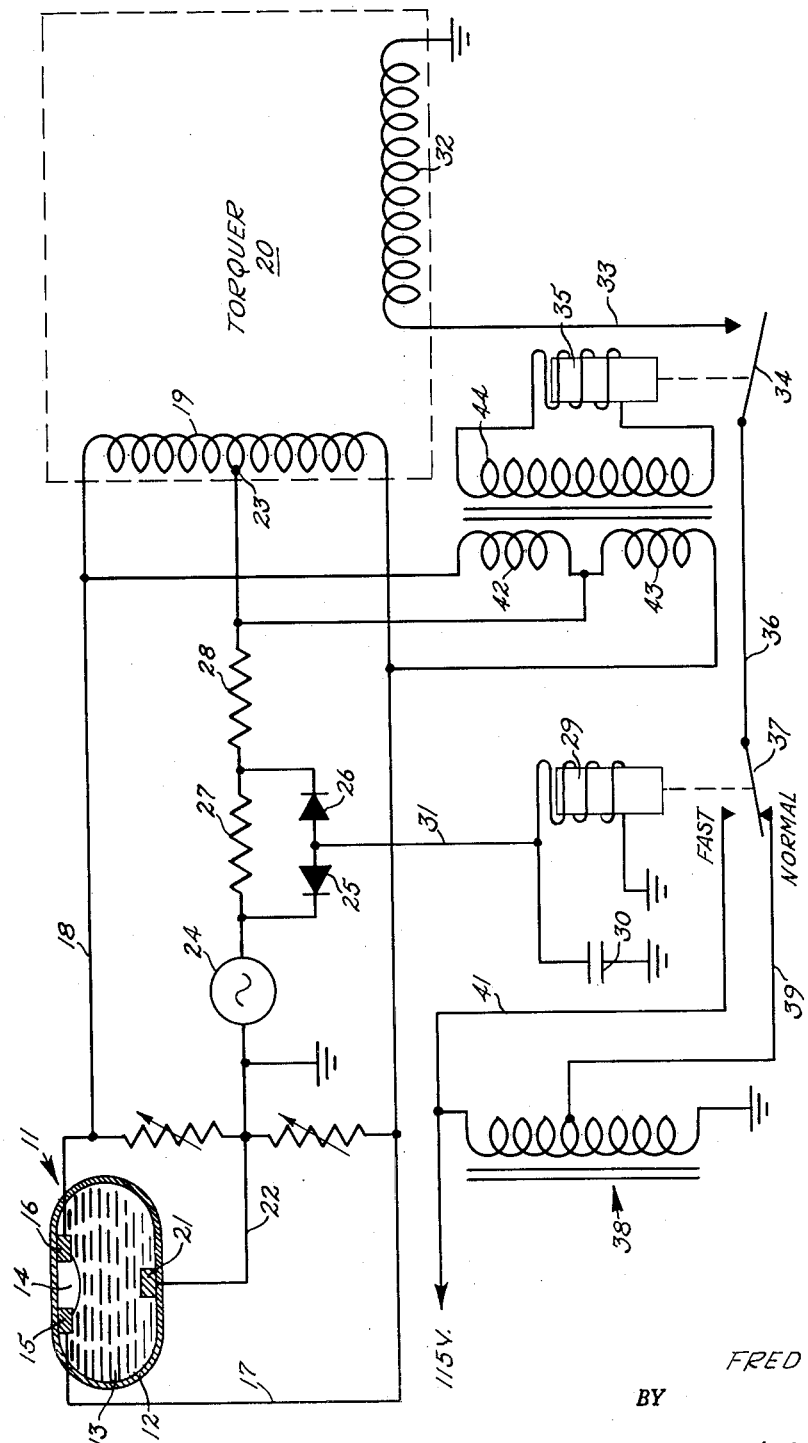
INVENTOR.
FRED U. SULMER
BY
H. H. Losche
ATTORNEYS

United States Patent Office 2,986,946
Patented June 6, 1961

2,986,946
AUTOMATIC ERECTION CONTROL FOR GYROSCOPE
Fred U. Sulmer, Baltimore, Md., assignor, by mesne assignments, to the United States of America as represented by the Secretary of the Navy
Filed Dec. 29, 1959, Ser. No. 862,735
3 Claims. (Cl. 74—5.47)

The present invention relates to an erection system for a gyro vertical and more particularly to an automatic control system for erecting a gyroscope that departs from the vertical.

Gyro verticals or artificial horizons are well-known in the aircraft art for supplying pitch and roll information to the pilot. Gyro verticals are susceptible to certain forces, such as the force of acceleration, and these forces are the main cause of errors in aircraft gyroscopic instruments. Particularly, a major source of error is due to the effect of centrifugal acceleration when the aircraft is turning about its yaw axis.

Various schemes have, in the past, been employed to counteract or nullify the undesirable influence of the forces that cause error in gyro verticals. For example, one method used in the past has been to use a cutout device for temporarily disabling the gyroscope erection system during the occurrence of unusual forces. These cutout devices employ electronic amplifiers for amplifying an error signal to cause the cutout device to operate, and also a number of relays are employed for interrupting the erection system circuit and re-establishing the circuit as soon as the acceleration ceases. These cutout systems have a high initial cost and the components must be replaced in a relatively short period of time.

In another erection system employed in the past, a gravity sensing switch is connected to a center-tapped torque motor winding, which is excited by a voltage source. As the gyroscope departs from vertical, a trapped air bubble in the gravity sensing switch moves, and unbalanced resistance paths are formed which in turn provide output voltages in each half of the torque motor windings. These voltages are combined with a fixed voltage in quadrature applied to the fixed torque motor winding to generate a torque which causes gyro precession. By having proper phase relationship, the precession becomes erection and there is, in effect, a closed loop which will provide error correction. To increase erection rates when large gyro errors are present, a switch is provided for the pilot to actuate so that a large voltage is applied to the fixed phase of the torque motor. When the gyro becomes erect, the pilot releases the switch and it returns to a normal erect position.

The disadvantage of this switch-actuating system is that it requires the attention of the pilot as he must hold the switch in the fast erection position when he desires fast recovery of his gyro vertical.

The present invention provides an improvement in the switch-actuating system in that the switch is automatically actuated to apply a large voltage to the fixed phase of the torque motor. A voltage detector is inserted in the switch circuit which will respond to a voltage proportional to a gyro displacement of 1 degree or more. This voltage detector is connected to a relay which automatically puts the gyro in fast erection until the gyro erects to within the 1 degree displacement. Thus the erection system no longer requires the pilot's attention.

It is, therefore, a general object of the present invention to provide an improvement in gyro vertical erection systems.

Another object of the present invention is to provide automatic means for applying a large voltage for generating a torque that precesses a gyro vertical.

Other objects and advantages of the present invention will be readily appreciated as the same becomes better understood by reference to the following detailed description when considered in connection with the accompanying drawing which is a schematic diagram of an improved erection system for a gyro vertical.

Referring now to the drawing, a gravity sensing switch 11 is provided for producing a signal proportional to the displacement of a gyroscope. The gravity sensing switch is comprised of a container 12 of insulating material, such as glass or plastic, within which a quantity of electrolyte 13 is contained. The electrolyte 13 does not completely fill the container 12 and thus there is an air bubble 14 within the container 12. Electrodes 15 and 16 are provided within container 12 and are connected through leads 17 and 18, respectively, to a torque motor winding 19. A third or common electrode 21 is provided within container 12 and is connected through lead 22 to a center-tap 23 on torque motor winding 19 in torquer 20. Torque motor winding 19 is excited by voltage source 24, such as 400 c.p.s.

A voltage detector is inserted between electrode 21 and center-tap 23 and the components are selected so that the detector responds to a voltage proportional to a displacement by the gyroscope of 1 degree or more. The voltage detector is comprised of zener diodes 25 and 26 and resistors 27 and 28. The value for the resistor 27 is chosen so that when the gravity sensing switch is displaced 1 degree the zener diodes will conduct and energize relay 29, which is connected to the zener diodes through lead 31. Capacitor 30 is provided to smooth the voltage across relay 29 so that ripple voltage will not switch the relay.

A second torque motor winding 32 is provided in torquer 20 and is connected through lead 33 to switch 34. Switch 34 is normally open and is actuated by relay 35. Lead 36 connects switch 34 and switch 37. Switch 37 is a two-position switch and these positions are designated as "fast" and "normal." Switch 37 is engaged with the "normal" position until actuated by relay 29. The terminal for the "normal" position is connected to a transformer 38 by lead 39. The terminal for the "fast" position is connected by lead 41 to a voltage source.

In operation, when gravity sensing switch 11 is in a level position, that is, when the gyro vertical with which it is associated is perfectly vertical, the resistance between electrodes 15 and 21 is equal to the resistance between electrodes 16 and 21, and consequently, the voltages in the two windings of torque motor winding 19 are in balance, and no torque is applied to the torquer 20. Likewise, the voltages in windings 42 and 43 are in balance, and no potential is induced in secondary winding 44. Therefore, relay 35 is not energized and switch 34 is open.

When the gravity sensing switch is tilted and the displacement is less than 1 degree, the resistance between the electrodes becomes unbalanced, due to the displacement of the air bubble 14, and consequently, the voltages in winding 19 are unbalanced, and torque is applied. Likewise, the voltages in windings 42 and 43 are not in balance and as a result a potential is induced in winding 44 which energizes relay 35 to close switch 34. With switch 34 closed, voltage is applied to winding 32 through switch 37 (in the normal position) and through transformer 38. The voltages in windings 19 and 32 generate torques which cause gyro precession and consequently, erection of the gyro vertical.

When the gravity sensing switch 11 is tilted more than one (1) degree, the voltage across resistor 27 becomes high enough so that zener diodes 25 and 26 will conduct and direct current will pass through to operate relay 29. Relay 29 will move switch 37 to the "fast" position, and in effect, cut transformer 38 out of circuit. Accordingly, a greater voltage will be applied to winding 32 and a greater torque applied to precess the gyro vertical. When the gyro vertical is erected to within 1 degree of vertical position, relay 29 will cut out, and switch 37 will be returned to "normal" position.

It can thus be seen that the present invention provides for an automatic increase in precessing torque when a gyro vertical is displaced at a relatively large angle. It can also be seen that when the gyro vertical is returned to a near erect position, a normal torquing voltage will be again applied.

Obviously many modifications and variations of the present invention are possible in the light of the above teachings. It is, therefore, to be understood that the invention may be practiced otherwise than as specifically described.

What is claimed is:

1. An erection system for a gyroscope comprising: a gravity sensing switch having first and second electrodes, a common electrodes, and an electrolyte; a first winding having a center-tap connection for producing a precessing torque in said gyroscope; a first voltage source connected between said common electrode and said center-tap connection; a second winding for producing a precessing torque in said gyroscope; a second voltage source connectable to said second winding; a transformer connectable between said second voltage source and said second winding; and means connected between said common electrode of said gravity sensing switch and said center-tap connection for switching said transformer to an inoperative condition.

2. An erection system for a gyroscope as set forth in claim 1 wherein said means connected between said common electrode of said gravity sensing switch and said center-tap connection for switching said transformer to an inoperative condition comprises at least one resistor connected between said first voltage source and said center-tap connection, at least one zener diode connected across said at least one resistor, a switch, and a relay connected to said zener diode for operating said switch when said zener diode is conducting.

3. An erection system for a gyroscope comprising: means for producing a signal proportional to displacement of a gyroscope from the vertical, a first winding having a center-tap connection for producing a precessing torque in said gyroscope, a first voltage source connected between said means and said center-tap connection of said first winding, a second winding for producing a precessing torque in said gyroscope, a second voltage source, a transformer connectable between said second voltage source and said second winding, at least one resistor connected between said first voltage source and said center-tap connection, at least one zener diode connected across said at least one resistor, a switch connectable between said second winding and said transformer, and a relay connected to said zener diode for operating said switch when said zener diode is conducting.

References Cited in the file of this patent

UNITED STATES PATENTS

| | | |
|---|---|---|
| 2,720,116 | Furst | Oct. 11, 1955 |
| 2,817,975 | Granqvist | Dec. 31, 1957 |
| 2,880,618 | Jessup | Apr. 7, 1959 |
| 2,900,826 | Schneider | Aug. 25, 1959 |
| 2,907,213 | Wendt | Oct. 6, 1959 |

FOREIGN PATENTS

| | | |
|---|---|---|
| 1,096,983 | France | Feb. 9, 1955 |